United States Patent
Christopher et al.

(10) Patent No.: US 7,506,931 B2
(45) Date of Patent: Mar. 24, 2009

(54) HYDRAULICALLY POWERED FOLDING VEHICLE SEAT FOLD

(75) Inventors: Hugh H. Christopher, West Bridgford (GB); Michael G. Maddelein, Northville, MI (US); Michael R. Hudswell, Gedling (GB)

(73) Assignee: Lear Corporation, Southfield, MI (US)

(*) Notice: Subject to any disclaimer, the term of this patent is extended or adjusted under 35 U.S.C. 154(b) by 297 days.

(21) Appl. No.: 10/997,842

(22) Filed: Nov. 24, 2004

(65) Prior Publication Data

US 2006/0001305 A1    Jan. 5, 2006

(30) Foreign Application Priority Data

Jul. 1, 2004    (GB)    ................. 0414907.6

(51) Int. Cl.
B60N 2/02    (2006.01)
B60N 2/32    (2006.01)
B60N 2/48    (2006.01)

(52) U.S. Cl. .............. 297/335; 297/15; 297/378.1; 296/65.18

(58) Field of Classification Search .............. 297/15, 297/378.1, 336, 257, 331, 378.13, 216.15, 297/378.14, 378.11; 296/65.01, 65.08, 65.09, 296/65.17, 65.18, 65.07
See application file for complete search history.

(56) References Cited

U.S. PATENT DOCUMENTS

| | | | |
|---|---|---|---|
| 1,942,070 A * | 1/1934 | Roy .................. | 296/65.07 |
| 2,795,266 A * | 6/1957 | Walther .............. | 297/216.18 |
| 3,760,911 A | 9/1973 | Porter et al. | |
| 3,777,617 A | 12/1973 | Okiyama | |
| 3,860,098 A | 1/1975 | Porter et al. | |
| 3,927,911 A | 12/1975 | Rosquist | |
| 4,550,750 A | 11/1985 | Korth | |
| 4,669,780 A * | 6/1987 | Sakakibara et al. ......... | 297/257 |
| 4,720,143 A | 1/1988 | Schwartz et al. | |
| 5,435,625 A | 7/1995 | Weber | |
| 5,743,591 A | 4/1998 | Tame | |
| 6,015,130 A | 1/2000 | Kigel | |
| 6,047,797 A | 4/2000 | Popjoy | |
| 6,059,253 A | 5/2000 | Koutsky et al. | |
| 6,142,564 A | 11/2000 | Pajela et al. | |
| 6,161,633 A | 12/2000 | Broom | |
| 6,382,491 B1 | 5/2002 | Hauser et al. | |
| 6,695,405 B2 * | 2/2004 | Senseby et al. .......... | 297/378.1 |
| 6,817,646 B2 * | 11/2004 | Kikuchi et al. .......... | 296/65.05 |
| 7,226,105 B2 * | 6/2007 | Christopher ............. | 296/65.08 |
| 2002/0067056 A1 * | 6/2002 | Garrido et al. ............. | 297/15 |

(Continued)

FOREIGN PATENT DOCUMENTS

DE    202 15 969    2/2003

(Continued)

Primary Examiner—Milton Nelson, Jr.
(74) Attorney, Agent, or Firm—MacMillan, Sobanski & Todd, LLC

(57) ABSTRACT

A folding vehicle seat assembly for an automotive vehicle comprising at least one movable seat portion, and at least one fluid powered actuator. The actuators are connected to an operating system which is selectively activatable by a vehicle occupant. The movable seat portion is movably mountable within the vehicle and connected to an actuator. The actuator, when activated, is arranged to move the movable seat portion between a seating position for supporting a seat occupant and a stowed position.

21 Claims, 2 Drawing Sheets

U.S. PATENT DOCUMENTS

| | | |
|---|---|---|
| 2002/0130542 A1 | 9/2002 | Ellerich et al. |
| 2003/0209929 A1 | 11/2003 | Muin et al. |
| 2004/0195892 A1* | 10/2004 | Daniels .................. 297/378.1 |

FOREIGN PATENT DOCUMENTS

| | | |
|---|---|---|
| DE | 101 52 561 | 5/2003 |
| EP | 0 316 675 | 5/1989 |
| EP | 0 878 348 | 11/1998 |
| EP | 1 077 153 | 2/2001 |
| EP | 1 188 608 | 3/2002 |
| GB | 897955 | 6/1962 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

HYDRAULICALLY POWERED FOLDING VEHICLE SEAT FOLD

CROSS REFERENCE TO RELATED APPLICATIONS

This application claims priority to Great Britain Patent Application No. 0414907.6 filed Jul. 1, 2004, the disclosures of which are incorporated herein by reference.

BACKGROUND OF THE INVENTION

The present invention relates to vehicle seats, and in particular to folding vehicle seat arrangements typically used for the rear seats of a vehicle.

Vehicle rear seats may be arranged to fold from a normal seating position to a stowed or flat position in order to increase the rear storage or luggage space of the vehicle. In addition vehicle seats may be arranged to fold and/or be moved from their seating position to allow passenger access behind the seat, and in particular to further seats located in the vehicle behind the folding seat. This is particularly the case in MPVs (or people carrier) type vehicles which include a third row of seats located behind a first row of rear seats and which are accessed through rear vehicle doors located adjacent to the first row of vehicle seats.

In typical folding seat arrangements the seat back is arranged to be manually unlocked and pivoted forward about its bottom edge from a substantially vertical seating position within the vehicle to allow access behind the seat, and/or folded flat such that the rear of the seat back is generally horizontal within the vehicle continuing the rear luggage floor of the vehicle to provide increased luggage area. The seat bottom cushion may also be pivoted forward about a front edge from a substantially horizontal seating position to a generally vertical position to allow the seat back to be folded flat into the space where the seat bottom cushion is located when in the seating position. A well or recess may also be provided beneath and/or forward of the seat bottom cushion into which the seat back and/or seat bottom cushion can be folded in their stowed positions.

Other folding arrangements are also known in which the seat bottom, and seat back portions are moved and pivoted from their normal seating positions in which the seat back extends generally vertically from the generally horizontally disposed seat bottom cushion, to a stowed position.

Manual folding of the seats and seat portions can be difficult for some users with complex manual folding and release latches often being used. In addition the seats can have considerable weight and in conjunction with the folding arrangements may be cumbersome to move from their seating to stowed positions. Furthermore manual locking arrangements to hold the seats in their seating position (or in the stowed positions) may inadvertently be operated undesirably releasing the seat with consequent safety implications. To prevent this more complex manual locking arrangements are used, which can then be difficult to operate an release the seat when it is required to be moved.

It is therefore desirable to provide an improved folding vehicle seat arrangement which addresses the above described problems and/or which offers improvements generally.

SUMMARY OF THE INVENTION

According to the present invention there is provided a folding vehicle seat as described in the accompanying claims.

In an embodiment of the invention there is provided a folding vehicle seat assembly for an automotive vehicle comprising at least one movable seat portion, and at least one fluid powered actuator. The actuator is connected to an operating system and is selectively activatable by a vehicle occupant. The at least one movable seat portion is movably mountable within the vehicle and connected to the at least one actuator to be moved by the actuator when activated between a seating position for supporting a seat occupant and a stowed position.

With this arrangement the movable seat portions can be simply and effortlessly moved between their seating positions to their stowed positions, and the vehicle variously configured to the desired load carrying configurations. The actuators also suitably and securely lock the seats and seat portions in either the seating or stowed positions.

Preferably the at least one moveable seat portion comprises a movable seat back, which may be pivotally mounted to pivot from a substantially vertical seating position to a substantially horizontal stowed position.

The at least one moveable seat portion may additionally or alternatively comprise a movable seat bottom cushion which may be pivotally mounted to pivot from a substantially horizontal seating position to a substantially vertical stowed position.

The operating system may comprise a fluid pump, control valve unit to control provide and control a flow of pressurized fluid to the at least one actuators, and a control switch to activate and operate the control unit. A control switch is preferably located on an instrument panel of the vehicle. This allows the seats, in particular rear seats to be remotely moved between their seating and stowed positions. Alternatively or additionally control switches may be is located adjacent to the vehicle seat. In particular an additional operating button may also be located near the rear door or doors of the vehicle, or elsewhere in the vehicle.

A manual release mechanism may also be provided to release the at least one actuator and allow manual movement of seat portion between the stowed and seating positions. Alternatively or additionally a manual release may comprise a hydraulic valve which is arranged and configured to allow fluid to flow to and from the actuator, and/or bypassing the control valves and pump to allow movement of the seat in the event of pump or control system failure.

The operating system may also include an interlock selectively preventing activation and operation of the at least one actuator. The interlocks prevent accidental and inadvertent release and movement of the seats between the seating and stowed positions. An additional safety latch may also be provided to lock the seat to the vehicle body in the upright position. The safety lock may comprise an additional mechanical or electromechanical arrangement, or fluid latch/ valve. In the case of a fluid operated valve this may comprise part of the fluid operating systems and be operated, releasing the seat when the hydraulic system is operated. A manual override may also be provided to then additionally/alternatively operate the fluid valve to release the seat in the event of failure of the fluid operating system.

The at least one movable portion may comprise a plurality of moveable seat portions connected to actuators, and the operating system when activated selectively activates the actuators in sequence in order to correctly move the seat positions and seat between the seating and stowed positions.

In a particular embodiment there is provided a vehicle seating arrangement comprising a plurality of folding vehicle seats as described above mounted within a vehicle with a single central operating system operating a number of the vehicle seats.

DETAILED DESRCRIPTION OF THE INVENTION

Figure 1:
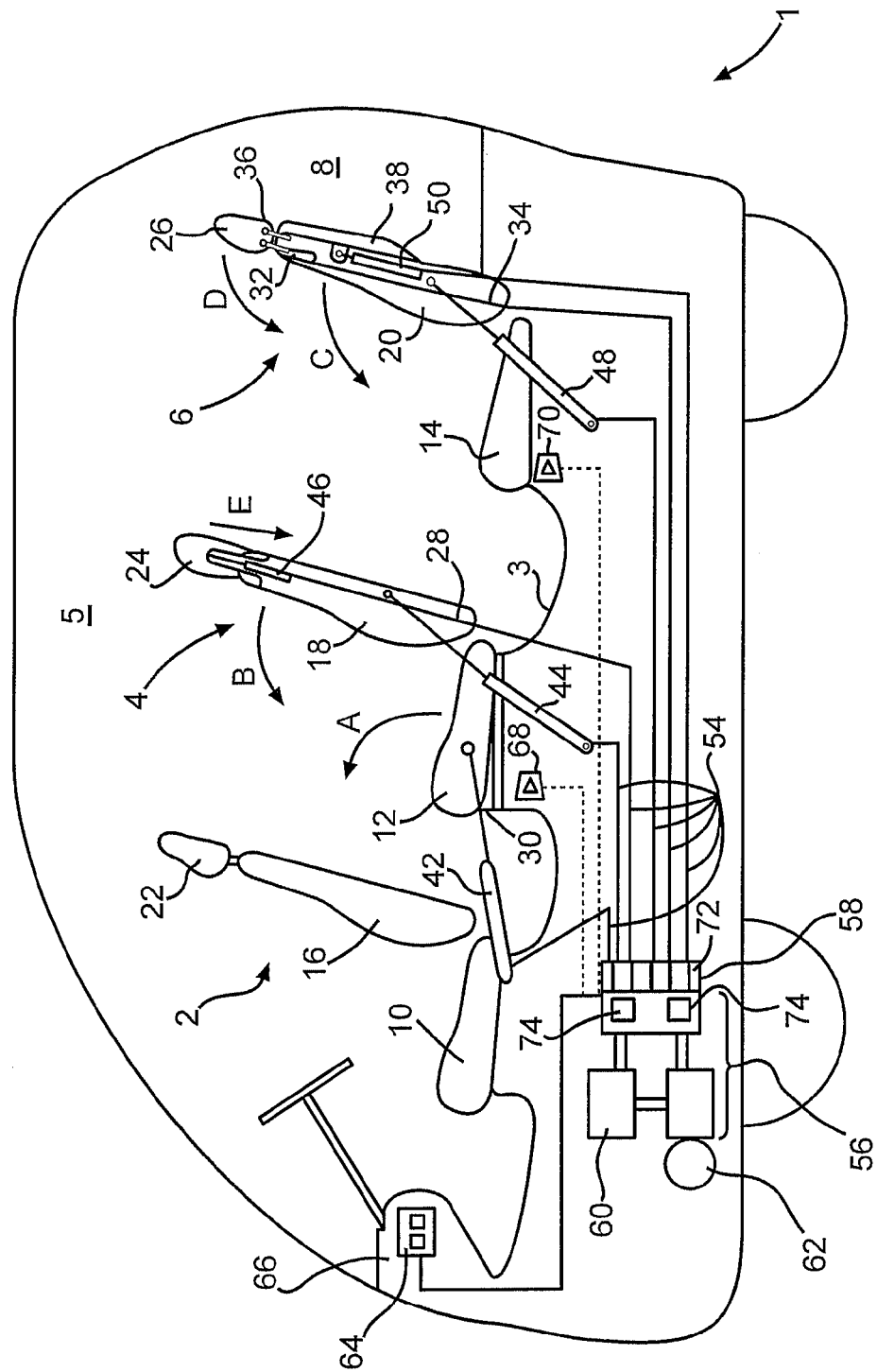
FIG. 1 is a schematic illustration of a vehicle including rear folding seat assemblies in accordance with an embodiment of the invention with the folding seat assemblies shown in their seating positions.

Referring to FIG. 1, there is shown a vehicle 1 of a typical MPV (Multi-Purpose Vehicle)/people carrier/mini van type including a number of occupant seats 2, 4, 6, in this case arranged in three rows within the vehicle 1. A front row of seats 2 is disposed at the front of the vehicle 1 and includes a driver's seat 2. A second, rear, row of seats 4 is mounted and located behind the front row of seats 2 within the vehicle 1, with a third row of rear seats 6 located behind the second row seats 4. It will be appreciated that whilst single seats 2, 4, 6 are shown in each row in the figures, each row may comprises at two or three seats disposed laterally side by side across the vehicle in each row. Alternatively one or more of the rows of seats may comprise a bench type seat extending completely across the vehicle. It will also be appreciated that the seats 2, 4, 6 may be arranged in different configurations within the vehicle 1, for example side on within the vehicle 1 and/or with the rear seats 4, 6 in longitudinally extending rows.

Figure 2:
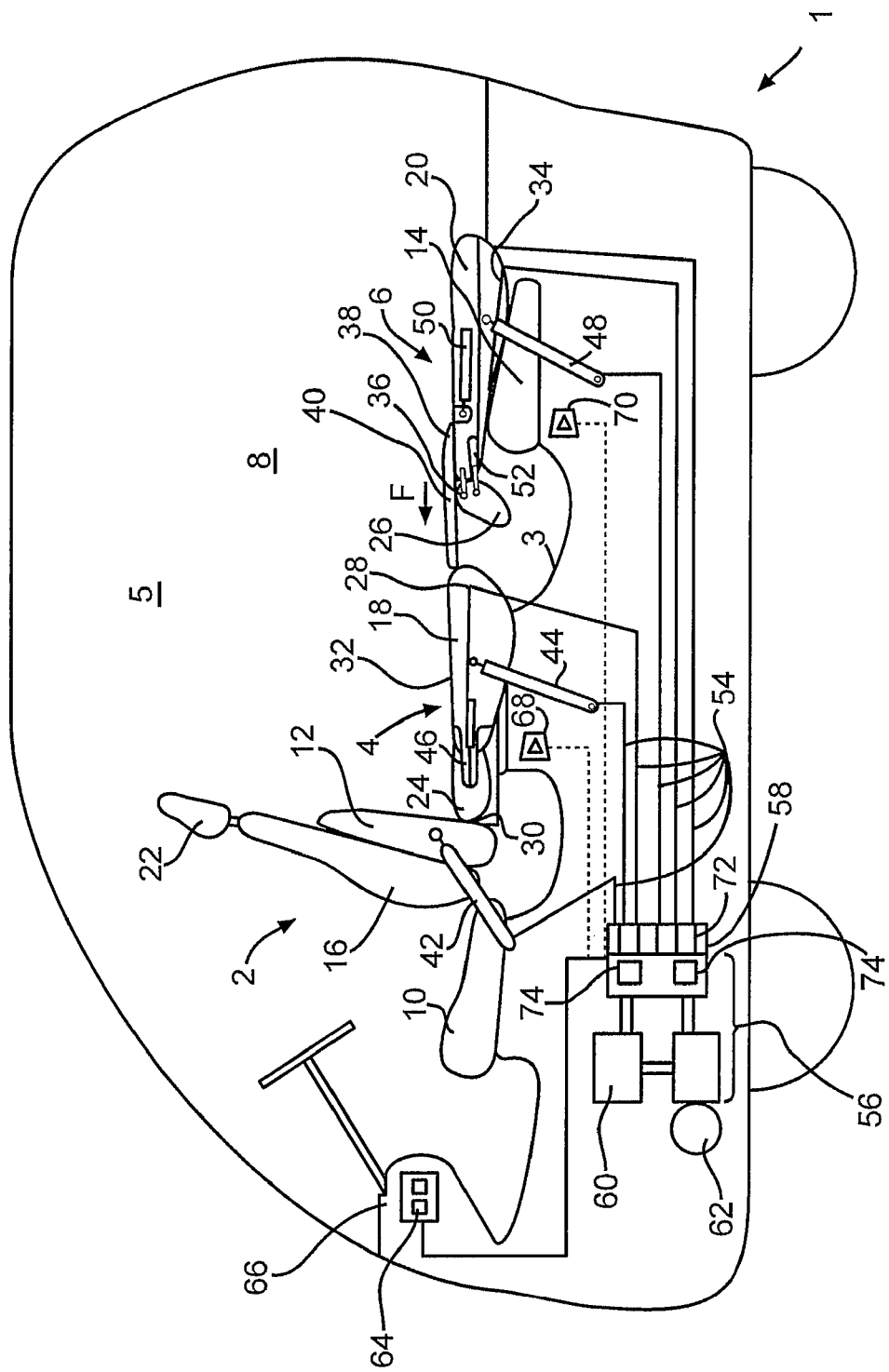
FIG. 2 is schematic illustration similar to FIG. 1 but showing the folding seats shown in their stowed positions.

The rear seats 4, 6, second and third rows of seats, are configured and mounted within the vehicle 1, as will be described further below, such that they can be moved and folded from a seating position for supporting a vehicle occupant as shown in FIG. 1, to a stowed position as shown in FIG. 2 in order to provide an increased luggage area 8. Whilst FIG. 2 shows both the second and third rows of seats 4, 6 in the stowed position each of the rows of seats 4, 6 can be folded independently and separately such that only the third row, or only the second row of seats can be placed into the stowed position. In addition each of the individual seats 4, 6 of each row of seats can also be independently moved to a stowed position. For example some or all of the seats 2, 4, 6 on one side of the vehicle 1 could be placed in a stowed position to provide an elongated luggage space on one side of the vehicle 1 whilst the seat on the other side provide seating for passengers. In this way a wide variety of different seating and luggage space configurations can be provided.

The seat 2, 4, 6 assemblies each comprise a seat bottom cushion 10, 12, 14, a seat back 16, 18, 20, and headrest 22, 24, 26. In the seating position the seat bottom cushions 10, 12, 14 are disposed horizontally within the vehicle 1 with the seat backs 16, 18, 20 extending generally vertically from a rear edge of seat bottom cushion 10, 12, 14 in order to support a vehicle occupant.

In this particular embodiment the seat bottom cushion 12 of the second row seats 4 is pivotally mounted such that it can be pivoted (arrow A) about a pivot axis 30 adjacent to the forward edge of the seat bottom cushion 12 into the stowed position. In the stowed position the seat bottom cushion 12 is then disposed generally vertically within the vehicle 1. The seat back 18 is also pivotally mounted, within the vehicle 1 such that the seat back 18 can be pivoted and folded down forwardly (arrow B) about a pivot axis 28 toward the lower edge of the seat back 18 into the space previously occupied by the seat bottom cushion 12 and into the stowed position in which a back surface 32 of the seat back 18 is horizontal. The headrest 24 is retractably mounted on the top of the seat back 18 such that it can be retracted (arrow F) in order to allow the seat back 18 to fit into the space previously occupied by the seat bottom cushion 12.

The seat back 20 of the third row seats 6 are similarly pivotally mounted within the vehicle 1 such that the seat backs 20 can be pivoted and folded down forwardly (arrow C) about a pivot axis 34 toward the lower edge of the seat back 20 into the stowed position. In the case of the third row seats 6 however the seat bottom cushion 14 is fixed and the seat back 20 is simply folded on top of the seat bottom cushion 20 as shown. The headrests 26 also rather than being retractably mounted, are in the case of the third row seats 6 pivotally mounted to pivot forward (arrow D) about a pivot axis 36 at the top of the seat back 20. Upon the back of the third row seat backs 20 there is a movable infill panel 38. The infill panel 38 is arranged to slide and extend (arrow F) from the seat back 20 when the seat back 20 is folded into its stowed position such that a front edge of the infill panel 38 abuts the seat back 18 of the second row seats 4 in order to provide a continuous flat load platform 40.

Hydraulic actuators 42-52, for example hydraulic extending piston rams, are connected to the movable seat back 18, 20, seat bottom cushions 12, 14, head rests 24, 26, and infill panels 36. The actuators 42-52, which are shown only schematically in the figures, are located within the seat assemblies 4, 6 and/or suitably packaged below the vehicle floor 3 and away from the occupant space 5. The actuators 42-52 are connected via suitable pipework 54 to an operating system 56 comprising a control unit 58, reservoir 60 and hydraulic pump 62 to selectively when activated supply pressurized hydraulic fluid to the actuators 42, 52. The pipework 54 connecting the actuators 42-52 is located and disposed within the seat assemblies 4, 6 and beneath the vehicle floor 3. Operating switches 64 which operable by the driver and/or from the front seats 2 and which are preferably mounted upon the vehicle dashboard or instrument panel 66 with the other vehicle controls (not shown) are connected to the control unit 58 in order to activate and control the operation of the operating system 56. Additional control switches 68, 70 may also be provided elsewhere in the vehicle 1, for example near the rear doors and/or adjacent to the respective seat assemblies 4, 6, to similarly also activate the control unit 58 and actuators 42-52. When activated and supplied with pressurized hydraulic fluid by the operating system 56 and control unit 58 from the pump 62, the actuators 42-52 are respectively arranged to move the respective seat portions 12, 18, 20, 24, 26 between the seating and stowed positions.

The control unit 58, which includes a plurality of control valves (not shown), is configured to selectively supply hydraulic fluid to the various actuators 42-52 in order to selectively and independently move the various seat portions 12, 18, 20, 24, 26 of the seat assemblies 4, 6 between their seating and stowed positions. In addition the control unit 58 is also configured to operate the actuators 42-52 for a particular seat 4, 6 in the correct sequence, for example folding the seat bottom cushions 12 forward and/or retracting/pivoting the head rests 24, 26 prior to folding the seat backs 18, 20 forward.

The control unit 58 may also further include suitable safety interlocks 72, connected and operated by suitable sensors (not shown), to prevent operation of the control valves within the control unit and supply of fluid to the actuators 42-52 and so activation of the actuators 42-52 and movement of the seat portions 12, 18, 20, 24, 26 when for example the seat 4, 6 is occupied by a seat occupant and/or if for example the vehicle 1 is moving. An additional safety latch may also be provided to lock the seat to the vehicle body in the upright position. The safety lock may comprise an additional mechanical or electromechanical arrangement, or fluid latch/valve.

With this arrangement, by simply pressing the control switch 64, 68, 70 any or all of the seats 4, 6 can be simply and effortlessly moved between their seating positions to their stowed positions, and the vehicle variously configured to the desired load carrying configurations. The interlocks 72 also prevent accidental release and movement of the seats 4, 6 between the seating and stowed positions. The actuators 42-52 also suitably and securely lock the seats 4, 6 and seat portions 12, 18, 20, 24, 26 in either the seating or stowed positions.

Manual release valves 74 for each seat 4, 6 may also be provided in with the control unit 58 or located with each seat 4, 6, to allow the actuators 42-52 and so seat portions 12, 18, 20, 24, 26 to be released and manually moved in the event of a systems failure or if there is no power available to operate the hydraulic pump 62 and operating system 56. In particular the manual release may comprise a hydraulic valve which is arranged and configured to allow fluid to flow to and from the actuator, and/or bypassing the control valves and pump to allow movement of the seat in the event of pump or control system failure. Alternatively suitable latches (not shown) associated with the actuator connections to the moveable seat portions 12, 18, 20, 24, 26 may be provided to release the seat portions 12, 18, 20, 24, 26 and again allow the seat portions 12, 18, 20, 24, 26 to be manually moved.

As described all of the rear seats 4, 6 are provided with actuators 42-52 to move the seats 4, 6 and seat portions 12, 18, 20, 24, 26 between the seating and stowed positions. In alternative embodiments however only some of the seats 4, 6, for example the third row seats 6 only, may be provided with such actuator and powered movement seta stowage functionality. In addition in other embodiments actuators 42-52 may be provided to move only some of the moveable seat portions 12, 18, 20, 24, 26, for example the heavier or more cumbersome seat portions like the seat back 18, 20 and/or seat bottom cushions 12. The other seat portions, for example the headrests 24, 26 may be left to be manually moved between their seating and stowed positions.

In the particular embodiment shown there is a single hydraulic operating system 56 for all of the movable seats 4, 6 and seat actuators 42-52 located remotely from the seats 4, 6. This is the most cost effective arrangement minimizing the number of pumps 62, control units 58 valves etc. required. However in alternative embodiments separate operating systems comprising separate further control units and pumps may be provided for each seat row, or even seat 4, 6, and may be located nearer to the respective seats 4, 6 which they operate. Whilst such an arrangement increases the number of pumps 62 and control units 56 etc it will reduce the hydraulic pipework 54 required with simply suitable electrical connections being provided to the respective pumps and from the control switches 62, 68, 70 to the various control units.

Whilst a particular folding vehicle seat arrangement has been described and shown, it will be appreciated that there are other configurations and arrangements of folding seats which are moveable between a seating and a stowed position and that suitable actuators in accordance with the invention can be used in such other configurations.

In addition to the seats 4, 6 moving between their seating and stowed positions as shown, it will be appreciated that the seats 4, 6 may also be moveable in their seating positions to most comfortably accommodate and suit a seat occupant. For example the seat backs 18, 20 may be reclined and/or the seat 4, 6 and seat bottom cushions 12, 14 slid fore and aft.

Throughout this description and in the claims references to the seat back and seat bottom cushions being vertical or horizontal are used in a relative general sense. The seat back and seat bottom cushions may accordingly be arranged such that they are at an angle to a true horizontal or vertical orientation.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A folding vehicle seat assembly for an automotive vehicle comprising at least one movable seat portion and at least one fluid powered actuator connected to an operating system which is selectively activatable by a vehicle occupant, wherein the at least one movable seat portion is movably mountable within the vehicle and connected to the at least one actuator to be moved by the actuator when activated between a seating position for supporting a seat occupant and a stowed position, wherein the at least one moveable portion includes a seat bottom cushion and a seat back movably mountable within the vehicle and connected to respective actuators so to be respectively moved by the actuators when activated between a seating position for supporting a seat occupant and a stowed position.

2. A folding vehicle seat assembly as claimed in claim 1 in which the operating system includes a fluid pump, a control valve unit to control a flow of pressurized fluid to the at least one actuator, and a control switch to activate and operate the control valve unit.

3. A folding vehicle seat assembly as claimed in claim 1 further including a manual release mechanism to release the at least one actuator and allow manual movement of the seat portion between the stowed and seating positions.

4. A folding vehicle seat assembly as claimed in claim 1 in which the operating system includes an interlock selectively preventing activation and operation of the at least one actuator.

5. A folding vehicle seat assembly as claimed in claim 1 in which the operating system when activated selectively activates the actuators in sequence.

6. A folding vehicle seat assembly as claimed in claim 1 in which the at least one moveable seat portion further comprises an infill panel mounted on the seat portion and movable to cover a recess within a load area of the vehicle and provide a flat load floor.

7. A folding vehicle seat assembly for an automotive vehicle comprising at least one movable seat portion and at least one fluid powered actuator connected to an operating system which is selectively activatable by a vehicle occupant, wherein the at least one movable seat portion is movably mountable within the vehicle and connected to the at least one actuator to be moved by the actuator when activated between a seating position for supporting a seat occupant and a stowed position, and further including a manual release mechanism to release the at least one actuator and allow manual movement of the seat portion between the stowed and seating positions.

8. A folding vehicle seat assembly as claimed in claim 7 in which the operating system comprises a fluid pump, a control valve unit to control a flow of pressurized fluid to the at least one actuator, and a control switch to activate and operate the control valve unit.

9. A folding vehicle seat assembly as claimed in claim 7 in which the operating system includes an interlock selectively preventing activation and operation of the at least one actuator.

10. A folding vehicle seat assembly as claimed in claim 7 in which the at least one movable seat portion comprises a plurality of moveable seat portions connected to respective actuators, and in which the operating system when activated selectively activates the actuators in sequence.

11. A folding vehicle seat assembly as claimed in claim 7 in which the at least one moveable seat portion further comprises an infill panel mounted on the seat portion and movable to cover a recess within a load area of the vehicle and provide a flat load floor.

12. A folding vehicle seat assembly for an automotive vehicle comprising at least one movable seat portion and at least one fluid powered actuator connected to an operating system which is selectively activatable by a vehicle occupant, wherein the at least one movable seat portion is movably mountable within the vehicle and connected to the at least one actuator to be moved by the actuator when activated between a seating position for supporting a seat occupant and a stowed position, wherein the at least one movable seat portion includes a plurality of moveable seat portions connected to respective actuators, and in which the operating system when activated selectively activates the actuators in sequence.

13. A folding vehicle seat assembly as claimed in claim 12 in which the operating system comprises a fluid pump, a control valve unit to control a flow of pressurized fluid to the actuators, and a control switch to activate and operate the control valve unit.

14. A folding vehicle seat assembly as claimed in claim 12 further comprising a manual release mechanism to release the at least one actuator and allow manual movement of the seat portion between the stowed and seating positions.

15. A folding vehicle seat assembly as claimed in claim 12 in which the operating system includes an interlock selectively preventing activation and operation of the at least one actuator.

16. A folding vehicle seat assembly as claimed in claim 12 in which the at least one moveable seat portion further comprises an infill panel mounted on the seat portion and movable to cover a recess within a load area of the vehicle and provide a flat load floor.

17. A folding vehicle seat assembly for an automotive vehicle comprising at least one movable seat portion and at least one fluid powered actuator connected to an operating system which is selectively activatable by a vehicle occupant, wherein the at least one movable seat portion is movably mountable within the vehicle and connected to the at least one actuator to be moved by the actuator when activated between a seating position for supporting a seat occupant and a stowed position, wherein the at least one moveable seat portion further includes an infill panel mounted thereon and movable to cover a recess within a load area of the vehicle and provide a flat load floor.

18. A folding vehicle seat assembly as claimed in claim 17 in which the operating system comprises a fluid pump, a control valve unit to control a flow of pressurized fluid to the at least one actuator, and a control switch to activate and operate the control valve unit.

19. A folding vehicle seat assembly as claimed in claim 17 further comprising a manual release mechanism to release the at least one actuator and allow manual movement of the seat portion between the stowed and seating positions.

20. A folding vehicle seat assembly as claimed in claim 17 in which the operating system includes an interlock selectively preventing activation and operation of the at least one actuator.

21. A folding vehicle seat assembly as claimed in claim 17 in which the at least one movable seat portion comprises a plurality of moveable seat portions connected to respective actuators, and in which the operating system when activated selectively activates the actuators in sequence.

* * * * *